United States Patent [19]

Takehara et al.

[11] Patent Number: 5,248,009
[45] Date of Patent: Sep. 28, 1993

[54] VEHICLE REAR WHEELS STEERING APPARATUS

[75] Inventors: Shin Takehara, Hiroshima; Hiroshi Ohmura, Hatsukaichi; Ryuya Akita, Hiroshima; Isamu Chikuma, Maebashi; Hiroyuki Ito, Maebashi; Hiroshi Eda, Maebashi, all of Japan

[73] Assignees: NSK Ltd., Tokyo; Mazda Motor Corporation, Hiroshima, both of Japan

[21] Appl. No.: 755,337

[22] Filed: Sep. 5, 1991

[30] Foreign Application Priority Data

Sep. 12, 1990 [JP] Japan .................................. 2-239934
Sep. 12, 1990 [JP] Japan .................................. 2-239935
Sep. 25, 1990 [JP] Japan .................................. 2-258496

[51] Int. Cl.$^5$ ............................................. B62D 5/04
[52] U.S. Cl. ............................................. 180/79.1
[58] Field of Search .................. 180/79.1, 140; 280/91

[56] References Cited

U.S. PATENT DOCUMENTS 4,741,409  5/1988  Westercamp et al. .............. 180/79.1
5,068,584  11/1991  Herent et al. ...................... 318/549

FOREIGN PATENT DOCUMENTS 0371851  6/1990  European Pat. Off. .
57-44568  3/1982  Japan .................................. 180/79.1
61-46763  3/1986  Japan .................................. 180/79.1
61-163064  7/1986  Japan .................................. 180/79.1
0159178  7/1988  Japan .................................. 180/140
0095979  4/1989  Japan .................................. 180/140
2-24774  2/1990  Japan .................................. 180/79.1
0227378  9/1990  Japan .................................. 280/91

OTHER PUBLICATIONS

Patent Abstracts of Japan, vol. 013, No. 473 (M-884) Oct. 26, 1989.

Primary Examiner—Margaret A. Focarino
Assistant Examiner—Florian Zeender
Attorney, Agent, or Firm—Shapiro and Shapiro

[57] ABSTRACT

A vehicle rear wheels steering apparatus is provided with a guide member having a guideway capable of freely tilting toward the axis of the rod member. Therefore, when the rod member rotates around the axis, an operating member provided on the outside of the rod member rotates around the rod member axis along the guideway to steer the rear wheels by an amount corresponding to an amount of rotation of the rod member and an amount of tilting of the guideway.

6 Claims, 12 Drawing Sheets

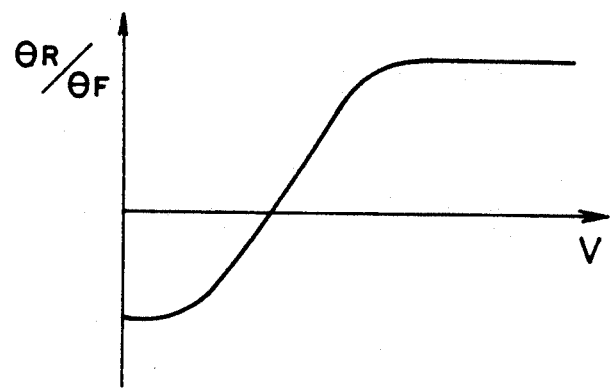
F I G. 17
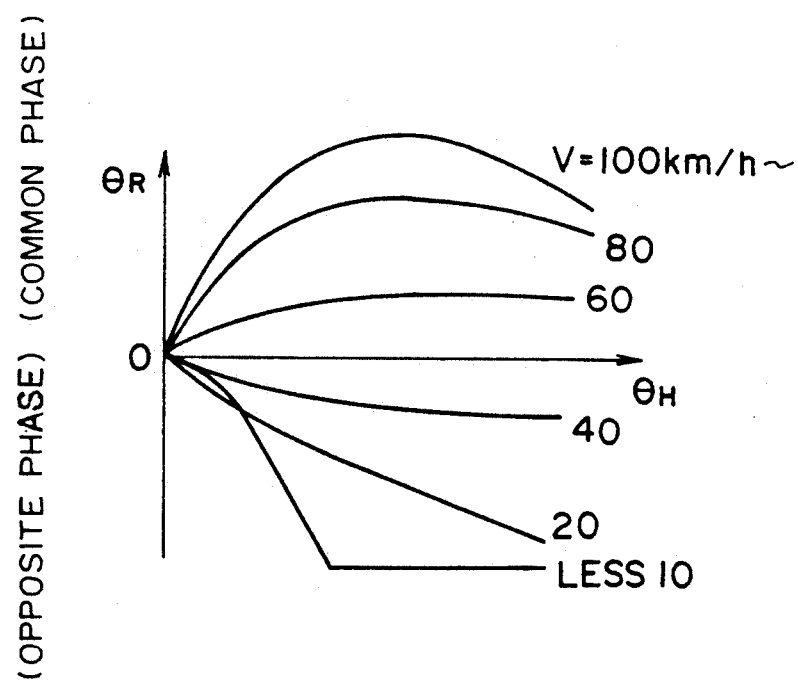
F I G. 18

VEHICLE REAR WHEELS STEERING APPARATUS

BACKGROUND OF THE INVENTION

1. Field of the Invention

This invention relates to a vehicle rear wheels steering apparatus.

2. Related Background Art

In recent years, a rear wheels steering apparatus in a vehicle, especially an automobile, has been developed, and some have been already put into the market. In Japanese Patent Laid-Open Publication No. 61-163064, an example of such a rear wheels steering apparatus has been described. The rear wheels steering apparatus will be described referring to FIG. 7.

FIG. 7 is a sectional view of a rear wheels steering apparatus according to the prior art. A worm 702 is coaxially mounted to an input shaft 701 whose front end is connected with the front wheels side steering mechanism (not shown). The worm 702 engages a worm wheel 703. The worm wheel 703 is connected with a double cylinder 704 by intersecting the mutual axes at right angles with each other, and when the worm wheel 703 rotates, the double cylinder is constructed to pivotally operate clockwise or couterclockwise.

The double cylinder 704 consists of an outer cylinder 704a and an inner cylinder 704b, and the inner cylinder 704b may freely rotate relative to the outer cylinder 704a. An opening 704c is provided at a part of the inner cylinder 704b, and a shaft 705 pivotally engages this opening 704c. The shaft 705 is installed to the outer periphery of a rod 706, and moves in the axial direction of the rod together with the rod 706. Both ends of the rod 706 are connected with a steering mechanism (not shown), and the wheels (not shown) are constructed so that they are steered in the axial direction of the rod 706. It is assumed here that when the rod 706 moves to the left, the rear wheels are steered to the left, and when the rod moves to the right, the rear wheels are steered to the right.

The rod 706 is rotatably supported around the axis, and the rotating force of a motor 708 is transmitted to the rod 706 through a worm mechanism 707. When the rod 706 rotates, the shaft 705 also rotates around the axis of the rod 706 accordingly.

The operation of the rear wheels steering apparatus according to the prior art will be described below.

At a position of the shaft 705 (turned upward) shown in FIG. 7, the input shaft 701 connected with the front wheels side steering mechanism is rotated by the driver's steering operation to rotate the worm wheel 703 counterclockwise. Thereby the shaft 705 moves to the left in FIG. 7 together with the rod 706, and the rear wheels are steered to the left, that is, in the normal phase to the front wheels and by an amount in proportion to the amount of steering of the front wheels.

On the other hand, assuming that the rod 706 is rotated by the rotation of the motor 708 to move the shaft 705 to a position opposite (turned downward) to the position shown in FIG. 7, when the worm wheel 703 lockwise by the driver's steering operation likewise, the shaft 705 moves to the right together with the rod 706, and the rear wheels are steered to the right, that is, in the reverse phase to the front wheels and by an amount in proportion to the amount of steering of the front wheels.

As can be seen from the above description, when the shaft 705 is perpendicular to the plane of FIG. 7, the rod 706 does not move according to the rotation of the worm wheel 703, and the steering of the rear wheels is not performed, irrespective of the driver's steering operation. That is, the amount of steering of the rear wheels can be continuously changed from the maximum amount in the normal phase in proportion to an amount of steering of the front wheels to zero and from zero to the maximum amount in the opposite phase by controlling the position of the shaft 705 by means of the motor 708.

In such a conventional rear wheels steering apparatus, however, a part of the steering torque to steer the front wheels is mechanically transmitted to rotate the worm wheel 703. Therefore, mechanical transmitting means for the steering torque similar to a propeller shaft will be required. Since, however, space is greatly restricted in a passenger car, the use of the mechanical transmitting means will narrow the inside of the car room, for which a large volume is required, increase its weight, and further cause a considerable amount of loss in torque due to the addition of a sliding portion.

With reference to such a conventional technique, a construction, in which a main motor and a sub-motor are used to rotate the rod and the double cylinder for control, is considered. In this construction, however, a reduction gear connected with the main motor or the sub-motor should be appropriately provided with a back lash between the teeth to be meshed to prevent interference on steering. In the vicinity of the neutral position, a very small relative movement occurs between the teeth owing to the back lash so as to deteriorate the steer-holding characteristic in the vicinity of the neutral position.

Further in such a rear wheels steering apparatus, it is necessary to detect the stroke of the rod in the axial direction in order to control the steering. Since, however, the rod moves in the axial direction while rotating, it is not easy to directly measure the rod stroke. A method to indirectly detect by adding a gear mechanism to the reduction gear for an actuator is generally used. However, providing the reduction gear unit with an indirect rod stroke detecting mechanism accumulates back lashes, and causes an error between the actual stroke and the detected value, leading to deteriorated controllability having a large so-called "dead zone".

Also if a trouble occurs with another electric signal system, it takes time to shift to a fail-safe state by judging the situation, owing to the large error, and it is very unfit for a vehicle-mounting device.

In addition, a rear wheels steering apparatus for vehicles as disclosed in, for example, Japanese Patent Laid-Open Publication Nos. 57-44568 and 61-46763, equipped with the following has been known: an electrically-driven motor, a steering mechanism for steering the rear wheels by transmitting the driving force of the motor to the rear wheels side, and a controller for controlling the operation of the above electrically-driven motor in accordance with the handle steering angle, the vehicle speed, etc.

This type of rear wheels steering apparatus has a merit that the number of degrees of freedom is not limited in the control in steering the rear wheels, such as being able to steer the rear wheels even when the front wheels steering angle is zero as compared with a type for steering the rear wheels by transmitting the steering force of the front wheels to the rear wheels side through a rod, etc.

As a countermeasure against a failure of the electrically-driven motor in this type of rear wheels steering apparatus, the steering mechanism is generally provided with a clutch for cutting off the transmission of power from the electrically-driven motor to the rear wheels and a centering spring for energizing the rear wheels at the neutral position.

Since the preset load for the centering spring has been set to a considerably high value in this case, the rear wheels will be rapidly returned to the neutral position when the electrically-driven motor is out of order during traveling while turning. Therefore we have some fear for safety. Also, there is a problem that the electrically-driven motor will have larger size and a greater output to cope with the high preset load, and at the same time, the rear wheels will not be quickly steered.

To solve these problems, it is considered to provide two electrically-driven motors in parallel and to use one of these motors as a spare when the other is out of order. Since, however, a clutch for switching the power transmission system for the electrically-driven motor is required in this case, the apparatus will have larger size. Also since the driving motor for spare is rarely used, there is a problem in the control of the operation.

SUMMARY OF THE INVENTION

It is an object of the present invention to provide a rear wheels steering apparatus for a vehicle with a good efficiency and unlimited number of degrees,. of freedom in control while still being compact.

It is a further object of the present invention to provide a rear wheels steering apparatus for a vehicle having a reduction gear in which the back lash in the vicinity of the neutral position has been efficiently eliminated.

It is another object of the present invention to provide a wheels steering apparatus for a vehicle capable of directly detecting the rod stroke with a simple construction.

It is another object of the present invention to provide a rear wheels steering apparatus for a vehicle capable of securing safety when the electrically-driven motor is out of order while miniaturizing the apparatus and securing quick steering of the rear wheels by means of a proper combination of two motors.

A vehicle rear wheels steering apparatus according to a first aspect of the invention comprises a main motor, a sub-motor, a rod member for steering in rear wheels by moving in the axial direction, a guide member having a guideway to be tilted toward the axial direction of the rod member by the rotating force of the sub-motor, and an operating member for projecting from the rod member in the radial direction and being guided by the guideway.

The rotating force of the main motor rotates the rod member around the axis, and thereby the operating member rotates around the rod member along the guideway.

When the operating member rotates around the axis of the rod member, the operating member moves by a distance corresponding to an amount of rotation of the rod member and an amount of tilting of the guideway of the guide member together with the rod member in the axial direction thereof to steer the rear wheels.

According to the vehicle rear wheels steering apparatus of the first aspect of the invention since the guide member is tilted by the sub-motor and the rod member is rotated by the main motor, it is possible to manufacture a compact rear wheels steering apparatus, reduce the loss in the driving torque and enlarge the degree of freedom in control.

A vehicle rear wheels steering apparatus according to a second aspect of the invention comprises a main motor, a sub-motor, a rod member for steering the rear wheels by moving in the axial direction, a guide member having a guideway to be tilted toward the axis of the rod member by the rotating force of the sub-motor, and an operating member for projecting from the rod member in the radial direction and being guided by the guideway.

The rotating force of the main motor rotates the rod member around the axis, and thereby the, operating member rotates around the axis of the rod member along the guideway.

When the operating member rotates around the rod member, the operating member moves by a distance corresponding to an amount of rotation of the rod member and an amount of tilting of the guideway of the guide member together with the rod member in the axial direction thereof to steer the rear wheels.

A reduction gear is connected with at least either the main motor or the sub-motor, and is composed of a shaft in which a spiral groove is formed at the outer periphery, a ball nut in which a spiral groove corresponding thereto is formed at the inner periphery, a plurality of balls placed in both spiral grooves, a rack formed on the side of the ball nuts and a pinion for engaging the rack.

The space width of the tooth space at the center of the rack is smaller than that of other tooth spaces.

According to the vehicle rear wheels steering apparatus of the second aspect of the invention the reduction gear comprises a shaft in which a spiral groove is formed at the outer periphery, a ball nut in which a spiral groove corresponding thereto is formed at the inner periphery, a plurality of balls placed in both grooves, a rack formed on the side of the ball nuts and a pinion for engaging the rack.

Since the space width of the tooth space at the center of the rack is smaller than that of other tooth spaces, the back lash between the teeth can be made comparatively smaller when the pinion engages the tooth space at the center of the rack, and the back lash between the teeth can be made comparatively larger when the pinion engages the tooth space other than at the center of the rack. This does not cause undue interferences between the teeth during steering, but enables improving the steer-holding characteristic at the vicinity of the neutral position.

A vehicle wheels steering apparatus according to a third aspect of the invention comprises a main motor, a sub-motor, a rod member for steering the rear wheels by moving in the axial direction, a guide member having a guideway to be tilted toward the axis of the rod member by the rotating force of the sub-motor, and an operating member for projecting from the rod member in the radial direction and being guided by the guideway.

The rotating force of the main motor rotates the rod member around the axis, and thereby the operating member rotates around the axis of the rod member along the guideway.

When the operating member rotates around the axis of the rod member, the operating member moves by a distance corresponding to an amount of rotation of the rod member and an amount of tilting of the guideway of the guide member together with the rod member in the axial direction thereof to steer the wheels.

Rack teeth are formed on a part of the outer periphery of the rod member, each of the rack teeth extends over a substantial portion of the periphery in the circumferential direction, and the rack teeth engage a gear mounted to the input shaft of a rotation detecting device to detect the amount of movement of the rod member which moves in the axial direction while rotating.

According to the vehicle wheels, steering apparatus of the third aspect of the invention rack teeth are formed on a part of the outer periphery of the rod member, and each of the rack teeth extends over a substantial portion of the periphery in the circumferential direction. Therefore, the gear mounted to the input shaft of the rotation detecting device remains engaging the rack tooth even if the rod member rotates, and accordingly the amount of movement of the rod member can be detected.

According to a fourth aspect, the invention of this application is constructed as a vehicle rear wheels steering apparatus to have a first motor for being controlled at least in accordance with the handle steering angle, a variable steering ratio mechanism for changing the steering ratio of the front to rear wheels, a second motor for controlling the steering ratio by driving the variable steering ratio mechanism, a steering mechanism for imparting a steering angle to the rear wheels dependent upon the amount of rotation of the first motor and that of the second motor, and controlling means for controlling the first and second motors so that when either of both motors is out of order, the amount of driving forces of the other motor is set to zero.

A fifth invention of this invention is to further fix the steering ratio to a predetermined value by stopping the operation of the second motor while steering of the rear wheels is being controlled in the control means.

In the above construction according to the present invention, the first and second motors are normally controlled appropriately under the control of the control means, and a steering angle dependent upon the amounts of rotation of these two motors is imparted to the rear wheels through the steering mechanism to steer the rear wheels. Especially by stopping the operation of the second motor, the steering ratio of the front to the rear wheels is fixed to a predetermined value.

On the other hand, when either of the first and second motors is out of order, a state of two-wheel steering, in which the steering angle of the rear wheels becomes zero, is realized because the control means sets the amount of driving forces of the other motor to and the steering force, becomes also zero.

BRIEF DESCRIPTION OF THE DRAWINGS

FIG. 17 is a diagram showing the change characteristic of the steering ratio; and FIG. 18 is a diagram showing the change characteristic of the rear wheels steering angle.

DESCRIPTION OF THE PREFERRED EMBODIMENTS

Figure 1:
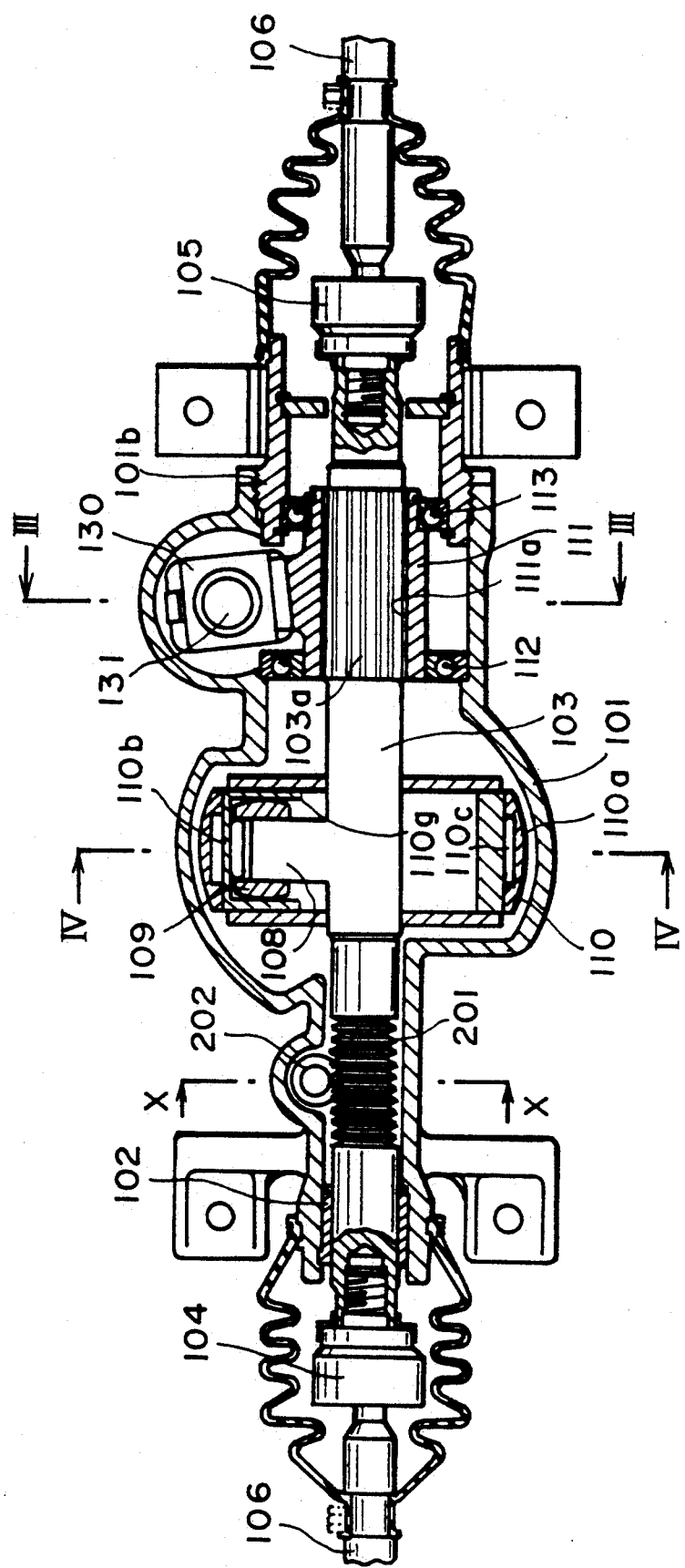
FIG. 1 is a principal portion sectional view of a vehicle rear wheels steering apparatus according to the present invention.

The present invention will hereinafter be described in detail with respect to embodiments thereof shown in the drawings.

FIG. 1 is a principal portion sectional view of a vehicle rear wheels steering apparatus according to the present invention. In a housing 101, a rod member 103 is supported by a plain bearing 102 in such manner as to be freely rotatable and freely movable in the axial direction. The two ends of the rod member 103 are rotatably connected with steering rods 106 and 107 through ball joints 104 and 105 respectively. The steering rods 106 and 107 are connected with the steering mechanisms for the right and left rear wheels respectively so that the rear wheels may be steered by moving the steering rods in the axial direction.

At the central part of the rod member 103, a cylindrical shaft 108, which is an operating member, is installed so that it projects in the radial direction. At the outer periphery of the shaft 108, a slide supporting member 109 is installed. The outer peripheral surface of the slide supporting member 109 is spherical.

A rod pivot 110, which is a guide member, is provided so that it encloses the shaft 108 therein. The rod pivot 110 is composed of an outer cylinder 110a, an inner cylinder 110b and a roller 110c existing between them, and the inner cylinder 110b is, rotatably supported by the outer cylinder 110a. The sliding member 109 for the shaft 108 is fitted in an opening 110g provided at the inner cylinder 110b. Even if the rod pivot 110 is tilted, the sliding member 109 has a spherical outer peripheral surface to prevent it from interfering with the inner wall of the opening 110g as mentioned later.

On the outer periphery of the rod member 103 on the left side of the shaft 108, rack teeth 201 are formed over the entire circumference. The rack teeth 201 engage a pinion gear 202.

Figure 10:
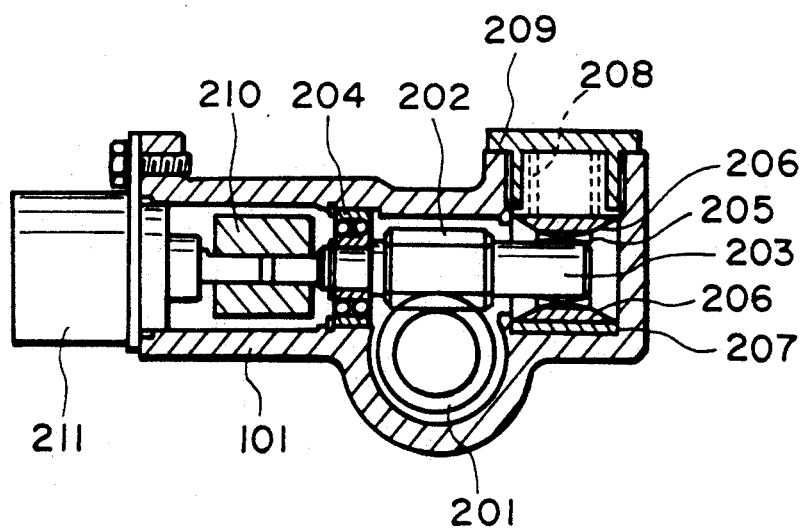
FIG. 10 is a sectional view taken on line X—X in FIG. 1.

The rod stroke detecting mechanism will be described in further detail referring to FIG. 10. FIG. 10 is a sectional view taken on line X—X in FIG. 1.

In FIG. 10, a pinion 202, which engages a rack 201, is coaxially mounted to a shaft 203. The left end of the shaft 203 is supported by an aligning type ball bearing 204, and its right end is supported by a plain bearing 205. The plain bearing 205 has been force fitted in the central part of a cylindrical supporting member 206, and the lower part thereof abuts on the housing 101 through an elastic spacer 207. The upper part of the cylindrical supporting member 206 abuts on a spring 208. The spring 208 is compressed by a cover 209 threadedly engaged with the housing 101 to apply an appropriate energizing force to the cylindrical supporting member 206.

This construction eliminates the back lash between gears 201 and 202, and the plain bearing 205 can slightly move upward even if the gear 202 receives an upward working thrust force from the rack 201. Therefore, the bearing can smoothly rotate without interference.

The left end of the shaft 203 is connected with a rotation detecting sensor 211 through a coupling 210, and the rotation detecting sensor 211 detects an amount of stroke of the rod member 103 as an amount of rotation corresponding to the amount of stroke thereof. The rotation detecting sensor 211 is electrically connected with a control device (not shown), and the amount of stroke of the rod member 103 is used as data for steering control within the control device.

The periphery of the rod pivot 110 will be described referring to FIGS. 4 and 5.

Figure 4:
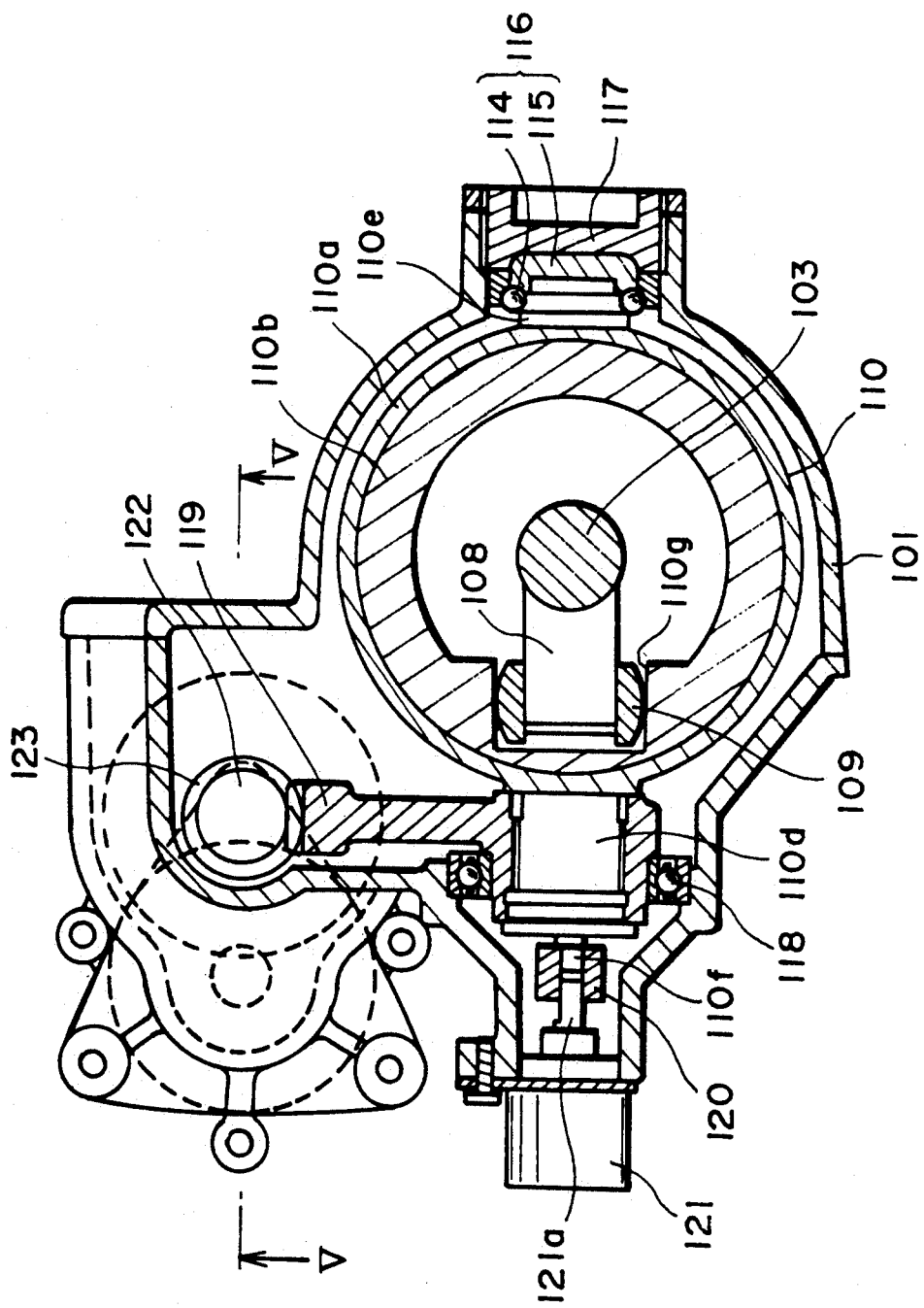
FIG. 4 is a sectional view taken on line IV—IV in FIG. 1.

FIG. 4 is a sectional view taken on line IV—IV in FIG. 1. FIG. 5 is a sectional view taken on line V—V in FIG. 4.

In FIG. 4, the shaft 108 is shown at a position rotated 90 degrees from the position shown in FIG. 1. Pivot shafts 110d and 110e horizontally project from the outer periphery of a rod pivot 110, and the pivot shaft, 110e is rotatably supported by a bearing 116 having balls 114 and a race member 115. Since the lace member 115 abuts on a pressing member 117 with a threaded portion provided on the outer periphery and the pressing member threadedly engages the housing 101, the bearing 116 is pressed toward the rod pivot 110 to adjust the play of the bearing.

The pivot shaft 110d is fitted in the central part of rotation of a sector gear 119 so that it may rotate as a unit together with the sector gear 119. The sector gear 119 is rotatably supported relative to the housing 101 through a bearing 118.

At the tip end of the pivot shaft 110d, a projection 110f is coaxially formed, and the projection 110f is connected with an input shaft 121a of a rotational angle sensor 121 through a coupling 120. Therefore, an amount of rotation of the sector gear 119, that is, an amount of tilt of the rod pivot 110 can be measured by the rotational angle sensor 121, and can be used as data, for example, to control the feedback. FIG. 1 shows that the rod pivot 110 is at the maximum angle position, and it will be able to tilt only counterclockwise toward space from this condition.

The sector gear 119 engages a worm gear 123 formed on the outer periphery of an intermediate shaft 122 above.

Figure 5:
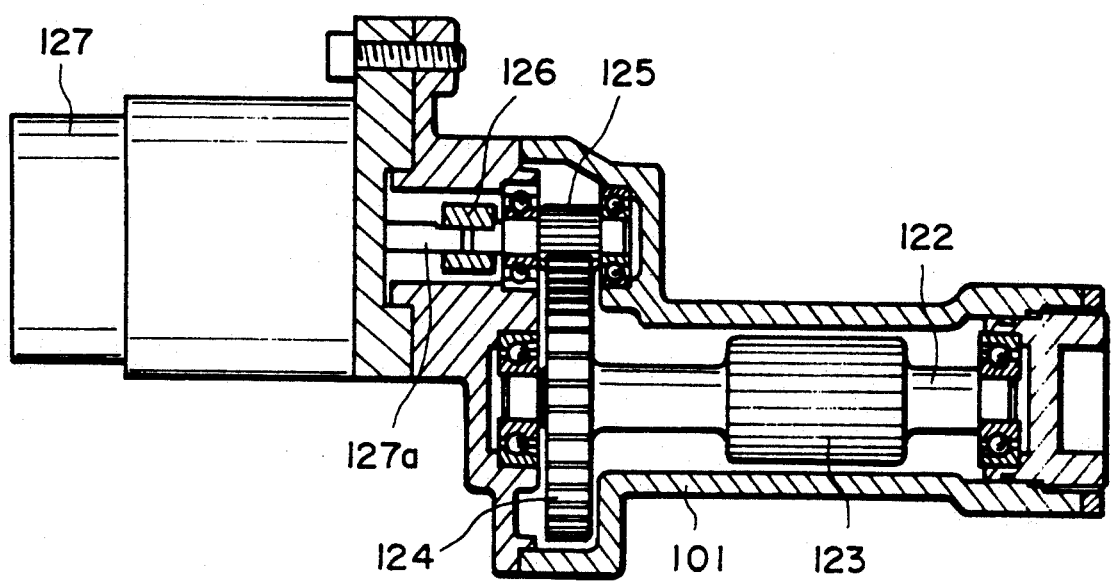
FIG. 5 is a sectional view taken on line V—V in FIG. 4.

In FIG. 5, the intermediate shaft 122 is rotatably supported by the housing 101. A large gear 124 is coaxially mounted to one end of the intermediate shaft 122, and the large gear 124 is engaged a small gear 125 rotatably supported likewise. The small gear 125 is connected with an output shaft 127a of a sub-motor 127 through a coupling 126.

Returning to FIG. 1 again, the description of the embodiment of the present invention will be continued. On a part of the rod member 103 in the right direction, a male spline portion 103a is formed over the entire periphery. On the outside thereof, a sector shaft 111 having a female spline portion 111a is provided, and the male spline portion 103a engages the female spline portion 111a. That is, the sector shaft 111 cannot rotate relative to the rod member 103, but can relatively move in the axial direction.

The sector shaft 111 is rotatably supported by the housing 101 through bearings 112 and 113. A pressing cylinder 101b, which may threadedly engage the housing 101, is constructed to press the sector shaft 111 through the bearing 113, and the play of the bearings 112 and 113 can be thereby adjusted The periphery of the sector shaft 111 will be described referring to FIGS. 2 and 3.

Figure 2:
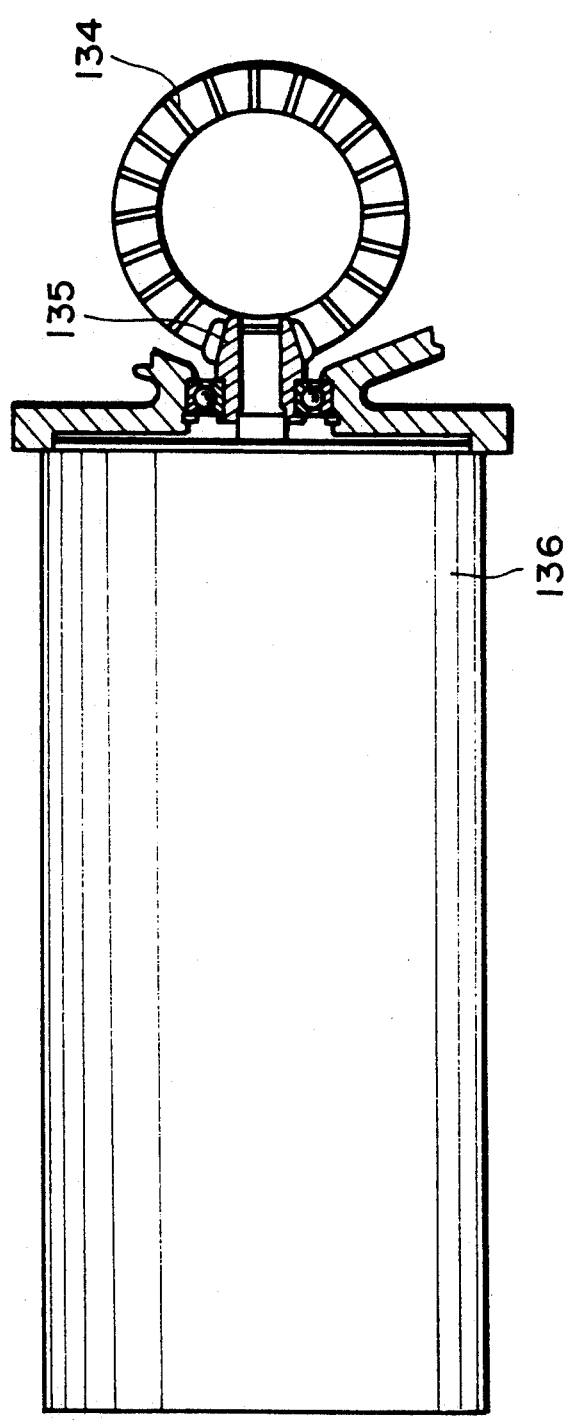
FIG. 2 is a sectional view taken on line II—II in FIG. 3.
Figure 3:
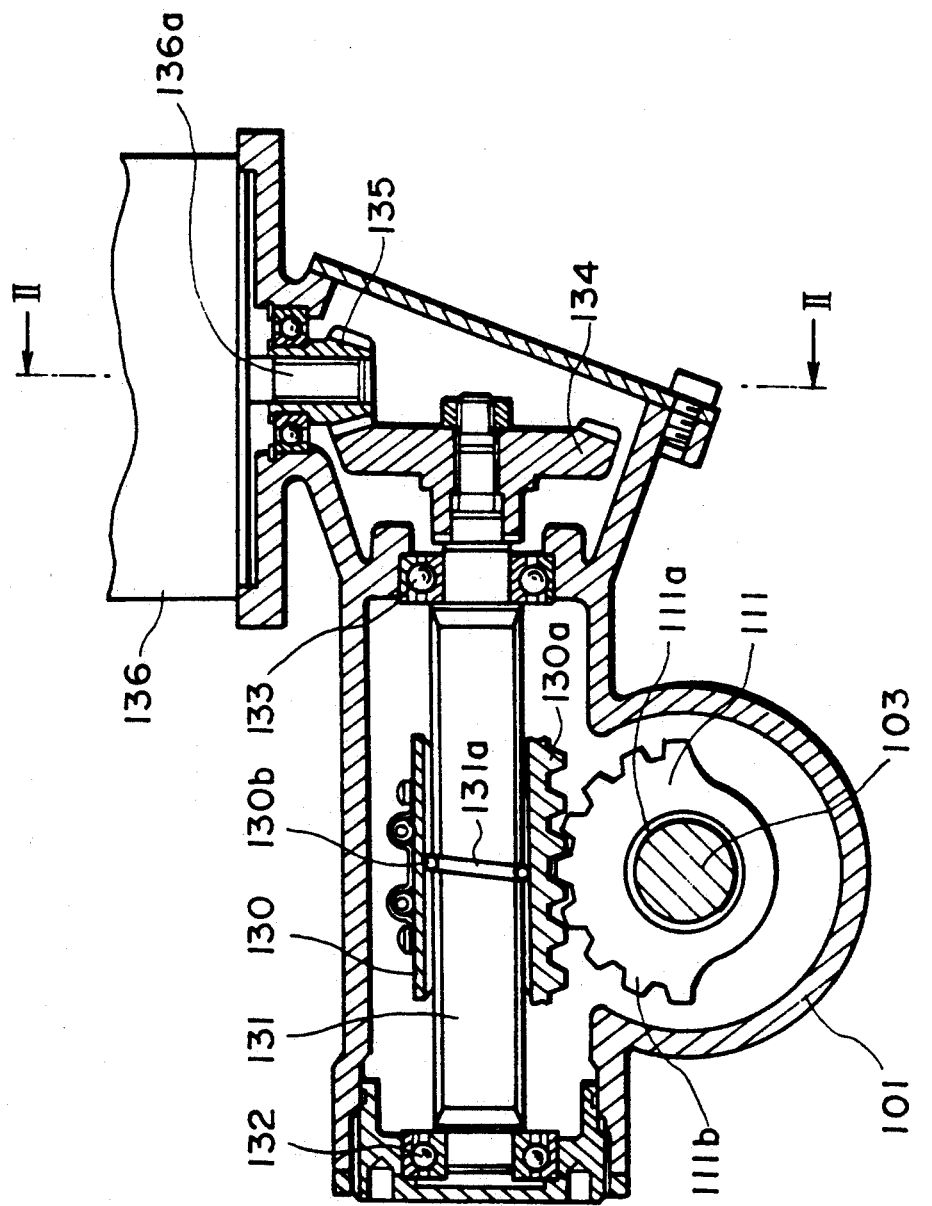
FIG. 3 is a sectional view taken on line III—III in FIG. 1.

FIG. 3 is a sectional view taken on line III—III in FIG. 1. FIG. 2 is a sectional view taken on line II—II in FIG. 3.

In FIG. 3, a sector shaft 111, which has been mounted around the rod member 103, has a pinion 111b on the outer periphery, and the pinion 111b engages a rack 130a formed on the outer periphery of a driving member 130. The driving member 130 threadedly engages the outer periphery of a driving shaft 131 in which a spiral groove (only partially shown) 131a has been formed on the outer periphery. The driving shaft 131 is rotatably supported by the housing 101 through bearings 132 and 133. A large number of balls 130b exist between the driving member 130 and the spiral groove 131a, and these balls 130b can roll within the spiral groove 131a.

That is, the driving member 130, the driving groove 131a and the balls 130b form a so-called "ball-nut mechanism". Therefore, when the driving shaft 131 rotates, the driving member is constructed to move in the left or right direction according to the direction of rotation.

Figure 8:
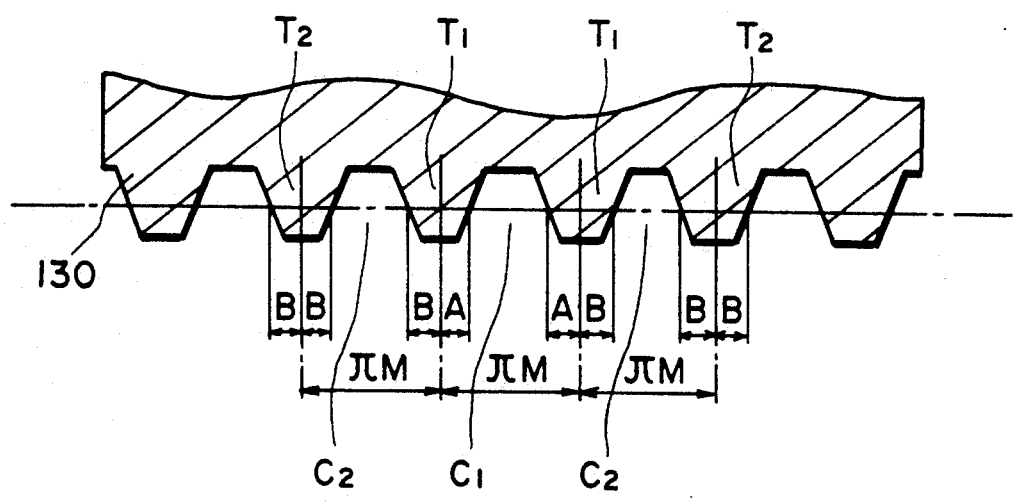
FIG. 8 is a grossly enlarged sectional view of a rack 130.

The rack 130a will be described in detail referring to FIG. 8. FIG. 8 is a grossly enlarged sectional view of a portion of the rack 130. In FIG. 8, the pitch of the rack 130a is fixed at $\pi M$ (module), but the circular tooth thickness for two teeth $T_1$ at the central part is $(A+B)$, that for two teeth $T_2$ outside thereof is $(B+B)$, and $A > \pi M/4 > B$. Therefore a void $C_1$ between two teeth $T_1$ at the central part is smaller than a void $C_2$ between teeth $T_1$ and $T_2$. Therefore, when the pinion 111a engages the tooth of the rack 130a within the void $C_1$, the back lash is comparatively small, and when the pinion 111a engages the tooth of the rack 130a within the void $C_2$, the back lash is comparatively large. Accordingly, the back lash between the pinion 111a and the rack 130a is small the so-called "neutral position" where the angle of steering of the rear wheels is almost zero. Therefore, by fixing the rack 130a in this state, the sector shaft 111 will not idle, but provide a steering characteristic with less play to improve the steer-holding characteristic.

On the other hand, while the angle of steering of the rear wheels is greater, the back lash between the pinion 111a and the rack 130 becomes larger, and smooth steering operation is performed without causing any interference between them.

Figure 9:
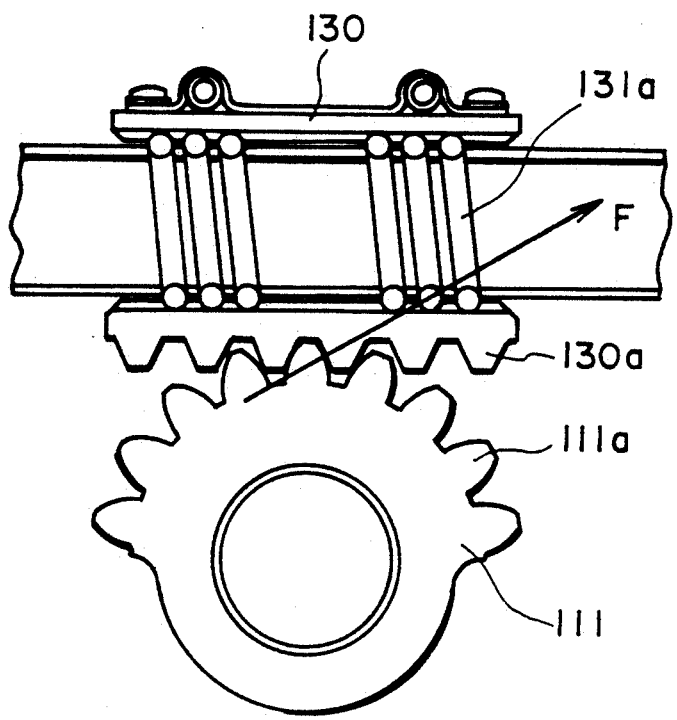
FIG. 9 is a view showing the direction of a force F working on the tooth surface when a pinion 111a engages the rack 130 at the neutral position.

FIG. 9 is a view showing the direction of a force F working on the tooth surface when the pinion 111a engages the rack 130 at the neutral position. As can be seen from FIG. 9, the extension of the force F passes through the inward rather than the outermost portion of the spiral groove 131a. This causes the driving member 130 not to get loose due to the force F working on the tooth surface at the neutral position, and provides a steering characteristic with a feeling rigidity.

The driving shaft 131 has a large bevel gear 134 at its end, and the large bevel gear 134 engages a small bevel gear 135. As shown in FIG. 3, the small bevel gear 135 is mounted to an output shaft 136a of a main motor 136.

The operation of a vehicle rear wheels steering apparatus according to an embodiment of the present invention will be described below.

In an automotive rear wheels steering control, the amount of steering of the rear wheels is determined on the basis of the amount of steering of the front wheels, the vehicle speed, the yawing rate, etc. In the above embodiment, a controller (not shown) is connected with the main motor 136 and the sub-motor 127, and data such as the amount of steering of the front wheels, the vehicle speed and yawing rate are input into the controller.

Driving signals mainly based on the vehicle speed, yawing rate, etc., are transmitted into the sub-motor 127 from the controller, and in this case, the output shaft of the sub-motor 127 rotates by an amount required for the control. The rotation of the sub-motor 127 rotates the sector gear 119 by a predetermined amount through gears 125 and 124. The rotation of the sector gear 119 tilts the rod pivot 110 by a specified amount.

Driving signals based on the amount of steering of the front wheels are transmitted to the main motor 136 from the controller, and the output shaft of the main motor 136 is thus rotated in accordance with the steering of the front wheels.

The rotation of the output shaft of the main motor 136 rotates the driving shaft 131 through the bevel gears 135 and 134, and the driving member 130 is thereby moved by a predetermined amount in the axial direction. As the driving member 130 moves in the axial direction, the sector shaft 111 rotates to rotate the rod member 103 by a predetermined amount The rotation of the rod member 103 rotates the shaft 108 around the axis of the rod member 103. When, however, the rod pivot 110 is tilting, the shaft 108 rotates as a unit together with the opening 110g in the inner cylinder 110b of the rod pivot 110, and therefore the shaft 108 will be guided so that it draws a spiral motion around the axis of rod member 103.

That is, the shaft 108 rotates around the axis of the rod member 103, and at the same time, is forced to move in the axial direction of the rod member. The rod member 103 is thereby moved in the axial direction, and moves the steering rod members 106 and 107 to steer the rear wheels by a predetermined amount.

When the shaft 108 rotates either above or below a horizontal plane passing through the axis of the rod member 103, a normal phase (the steering direction of the front wheels coincides with that of the rear wheels) enters, and when the shaft 108 rotates at other than the horizontal plane, a reverse phase (the steering direction of the front wheels is opposite to that of the rear wheels) enters. Further when the shaft 108 is on the horizontal plane, the amount of steering of the rear wheels is always zero.

Figure 6:
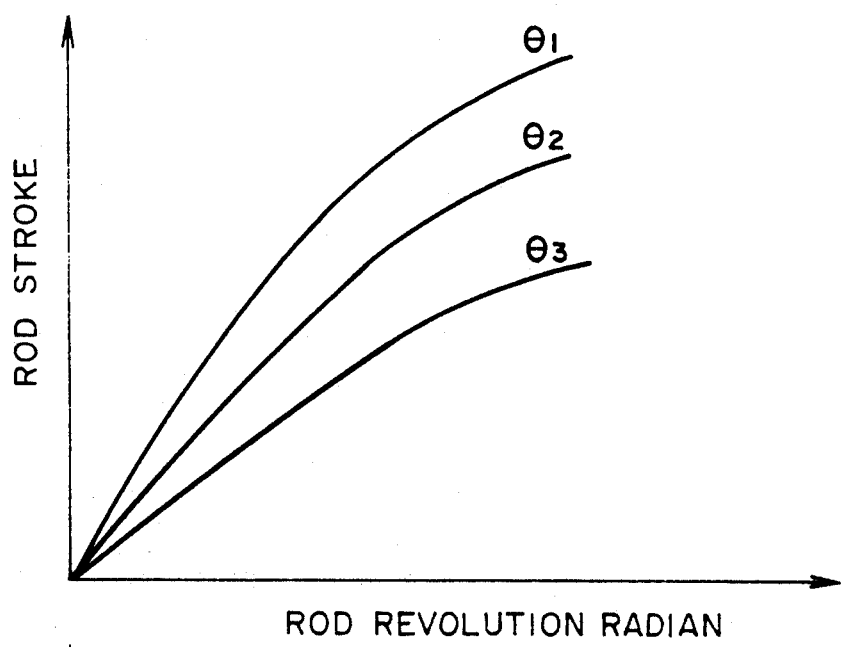
FIG. 6 is a graphical representation representing an amount of movement of the rod member 103 in the axial direction against the angle of rotation thereof, that is, rod stroke.
Figure 7:
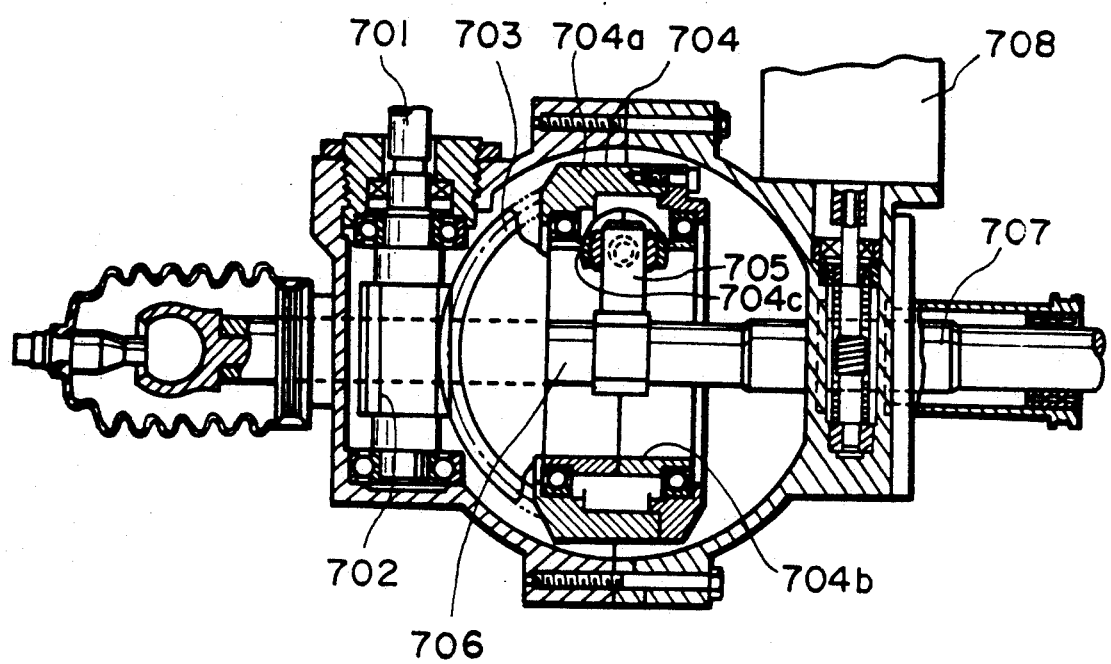
FIG. 7 is a sectional view showing a rear wheels steering apparatus according to a prior art.

If the front and rear wheels are different in vehicle speed, etc. even if the amount of steering of the front wheels is a fixed value, it is necessary to change the amount of steering of the rear wheels in accordance with it. FIG. 6 is a graphical representation representing an amount of movement of the rod member 103 in the axial direction against the angle of rotation thereof, that is, rod stroke.

In FIG. 6, an angle $\theta$ is used as an amount of tilting of the rod pivot 110, that is, an amount showing how much the rod pivot 110 has tilted against the radial surface of the rod member 103, and the sizes of angles have the following relationship:

$$\theta_1 > \theta_2 > \theta_3$$

As can be seen from FIG. 6, the rod member always moves longer in the axial direction in the case of the angle $\theta_1$ than in the case of the angle $\theta_3$ even at the same angle of rotation of the rod member. That is, by controlling the amount of tilting of the rod pivot 110 through the sub-motor 127, it is possible to deliberately control the amount of steering of the rear wheels against that of the front wheels.

In a state shown in FIG. 1, the amount of tilting of the rod pivot 110 is zero, and in this state, the rear wheels are not steered at all, irrespective of the amount of steering of the front wheels.

According to the vehicle rear wheels steering apparatus described above, the reduction gear comprises a shaft in which a spiral groove is formed at the outer periphery, a ball nut in which a spiral groove corresponding thereto is formed at the inner periphery, a plurality of balls placed in both grooves, a rack formed on the side of the ball nut and a pinion for engaging the rack.

Since the space width of the tooth space at the center of the rack is smaller than that of other tooth spaces, the back lash between the teeth can be made comparatively smaller when the pinion engages the tooth space at the center of the rack, and the back lash between the teeth can be made comparatively larger when the pinion engages the tooth space other than at the center of the rack.

This leads to a rear wheels steering apparatus in which any interference is not caused between the teeth during steering, the back lash in the vicinity of the neutral position is small, and accurate and stable control positioning with improved steer-holding characteristic is secured in conjunction with the ball-nut construction with high rigidity.

According to the vehicle wheels steering apparatus of the present invention, rack teeth are formed on a part of the outer periphery of the rod member, and each of the rack teeth extends over a substantial portion of the periphery in the circumferential direction. Therefore, the gear mounted to the input shaft of the rotation detecting device remains engaging the rack teeth even if the rod member rotates, and accordingly the amount of movement of the rod member can be detected. A vehicle wheels steering apparatus with high controllability can be obtained. Also even if a trouble occurs with other electric system signals, the apparatus is capable of quickly judging the abnormality to operate the fail-safe function, and is effective for safety of the vehicle.

Figure 11:
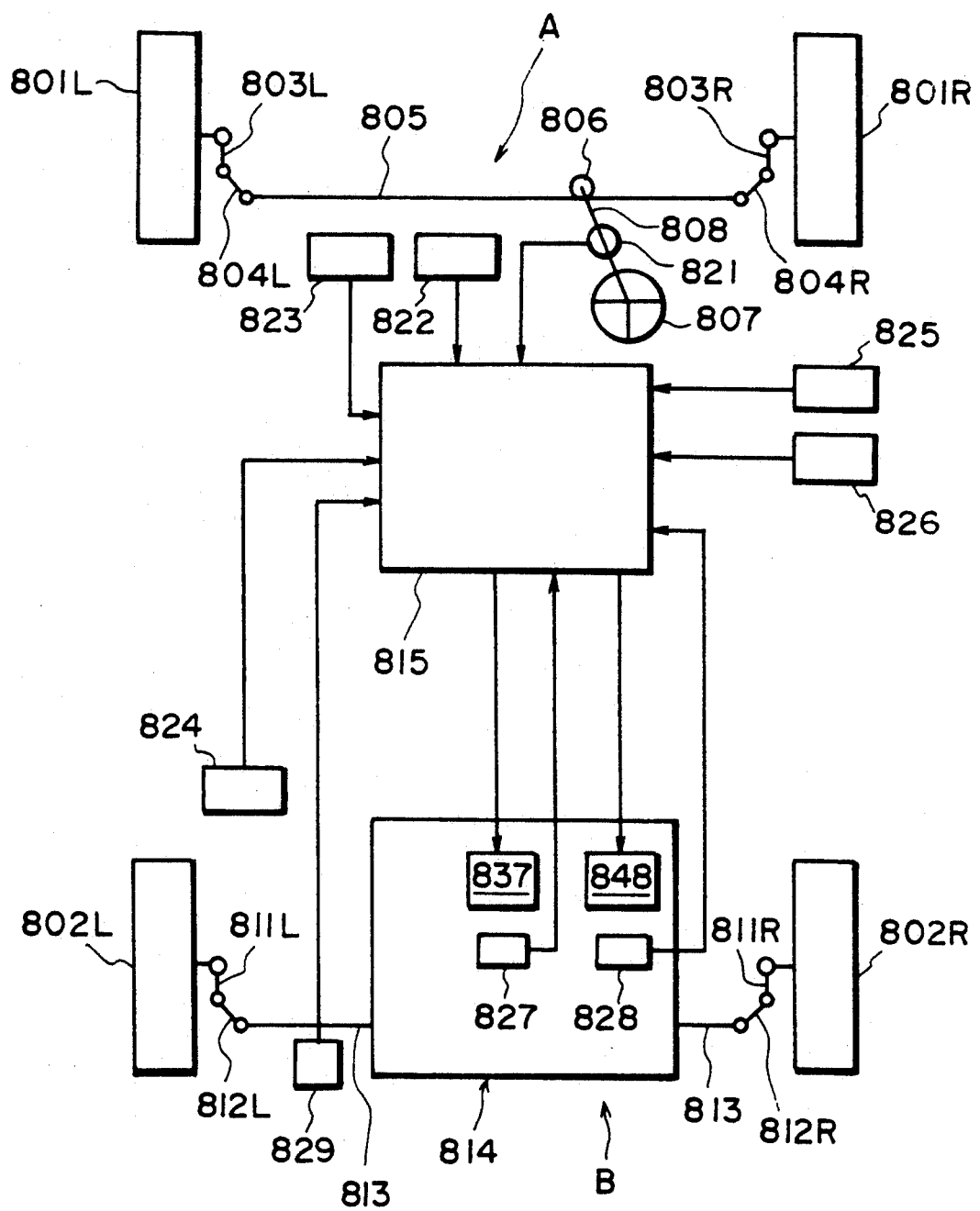
FIG. 11 is a general block diagram of the steering system of a vehicle.

FIG. 11 is a general block diagram for the steering system of a vehicle equipped with a rear wheels steering apparatus according to another embodiment of the present invention. The steering system of this vehicle is composed of a front wheels steering apparatus A for steering left and right front wheels 801L and 801R, and a rear wheels steering apparatus B for steering left and right rear wheels 802L and 802R.

The above-mentioned front wheels steering gear A has a pair (left and right) each of knuckle arms 803L and 803R, and tie rods 804L and 804R, a relay rod 805 for connecting the pair (left and right) of tie rods 804L and 804R with each other, and a steering shaft 808 in which a pinion 806 for engaging a rack tooth (not shown) formed on the relay rod 805 is provided at one end and a steering wheel 807 is provided on the other end. The front wheels steering gear A is constructed to steer the front wheels 801L and 801R by displacing the relay rod 805 in the vehicle width direction by the operation of the steering wheel 807.

On the other hand, the above-mentioned rear wheels steering gear B has a pair (left and right) each of knuckle arms 811L and 811R, and the tie rods 812L and 812R, a rear wheel steering mechanism 814 for steering the left and right rear wheels 802L and 802R by displacing in the axial direction (that is, the vehicle width direction) a relay rod 813 for connecting the pair (left and right) of tie rods 812L and 812R with each other, and a control unit 815 constituting a control unit for controlling the rear wheels steering mechanism 814 (operation of a first and second motors 837 and 848 as later discussed in detail).

A steering wheel angle sensor 821 detects the steering angle, a vehicle speed sensor 822 detects the vehicle speed, and lateral acceleration sensors 823 and 824 detect the lateral acceleration at the vehicle front and rear portions respectively. Numeral 825 in FIG. 11 is a brake switch, numeral 826 is an accelerator switch, and signals from these sensors 821 to 824 and switches 825 and 826 are input into the above control unit 815. Signals from various sensors in rear wheels steering mechanism 814, that is, an encoder 827, a steering ratio sensor 828 and a rear wheels steering angle sensor 829 are also input into the control unit 815.

The construction of the above-mentioned rear wheels steering mechanism 814 is shown in FIGS. 12 to 16. In these figures, both left and right ends of the relay rod 813 are connected with the tie rods 812L and 812R through ball joints 831 respectively, and a sector gear 832 is mounted to the relay rod 813 through spline in such a manner as to relatively move in the axial direction and rotate as a unit.

The above-mentioned sector gear 832 engages a gear portion 834a formed on the outer periphery of a ball screw 834 provided on a shaft 833, and the shaft 833 is connected with a first motor 837 through a set of bevel gears 835 and 836 for being driven. The normal or reverse rotation of the first motor 837 moves the ball screw 834 on the shaft 833 in the axial direction, and rotates a relay rod 813 around its axis through a sector gear 832. The above-mentioned first motor 837 is provided with an encoder 827, and operation information of the first motor 837 is output from the encoder 827 to control unit 815.

A variable steering ratio mechanism 841 changes a steering ratio (a ratio of the rear wheels steering angle $\theta R$ to the front wheels steering angle $\theta F$ ($\theta R/\theta F$)) of the front and rear wheels, and has an arm member 842 which is incorporated with the above-mentioned relay rod 813 at one and extends from the relay rod in the radial direction, and a circular ring member 843 which has been located on the outer periphery of the relay rod 813 corresponding to the arm member 842.

The above-mentioned ring member 843 has shaft portions 843a and 843b which extend in the perpendicular direction to the axis of the relay rod 813, and is supported so that it may rotate with the shaft portions 843a and 843b as the central shaft within a predetermined angular range relative to a housing 844. Also a ball bushing 845 is slidably provided on the inner peripheral surface of the ring member 843, and the tip end of the above-mentioned arm member 842 engages the ball bushing 845.

Figure 12:
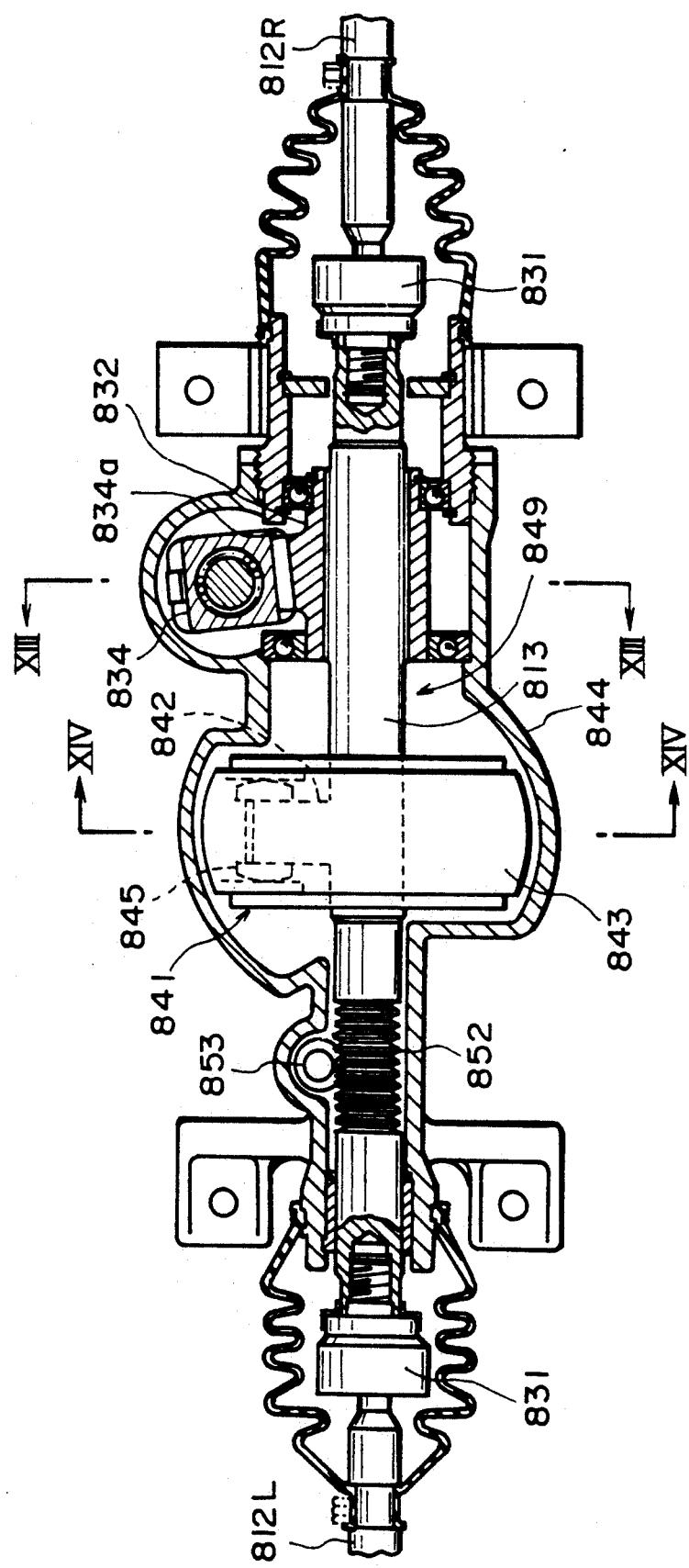
FIG. 12 is a sectional view of the rear wheels steering mechanism.
Figure 13:
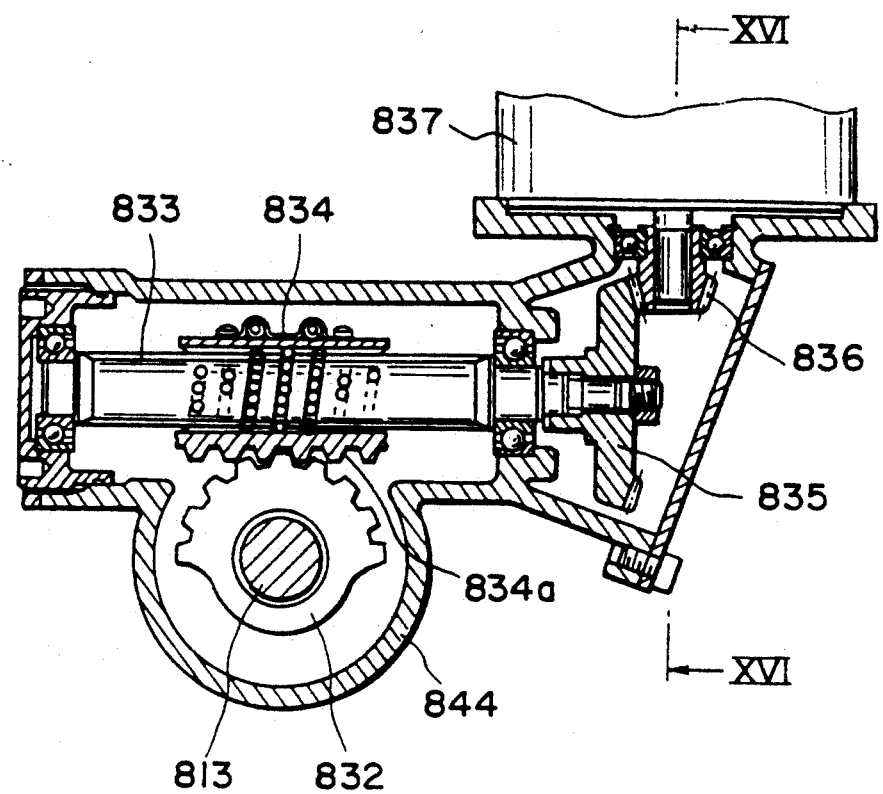
FIGS. 13 and 14 are sectional views taken on lines XIII—XIII and XIV—XIV in FIG. 12 respectively.
Figure 14:
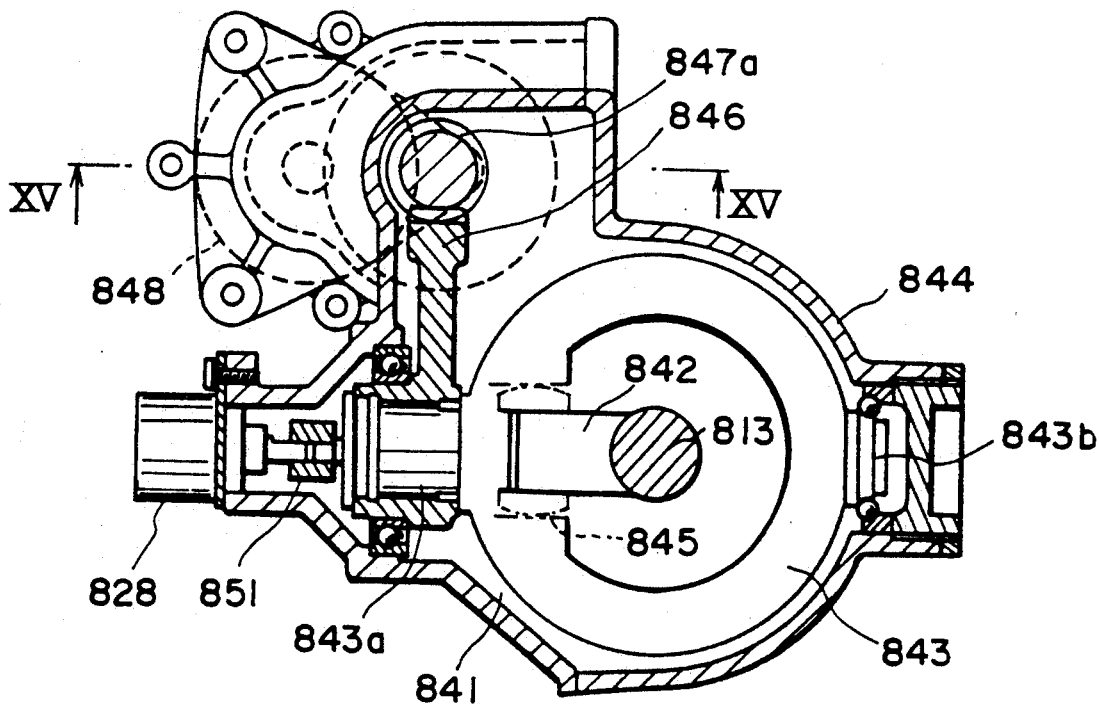
Figure 15:
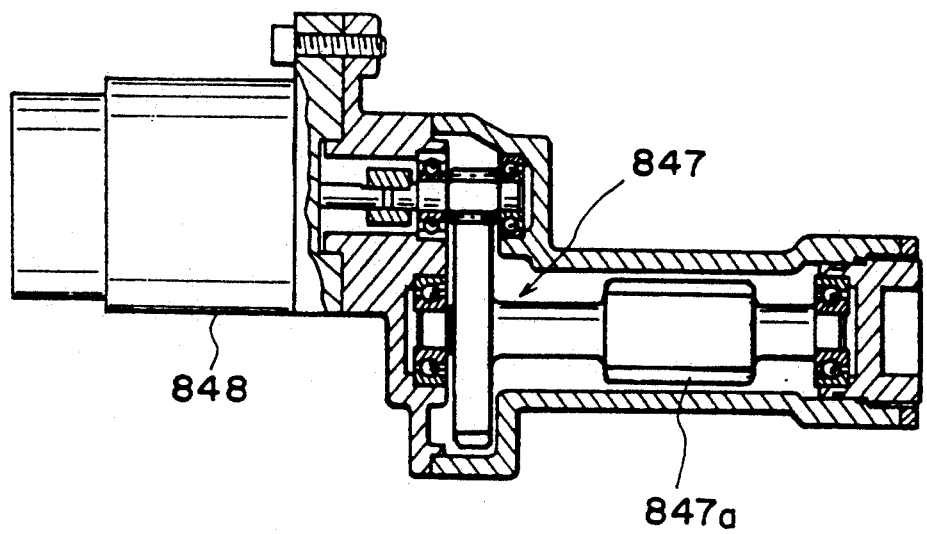
FIG. 15 is a sectional view taken on line XV—XV in FIG. 14.
Figure 16:
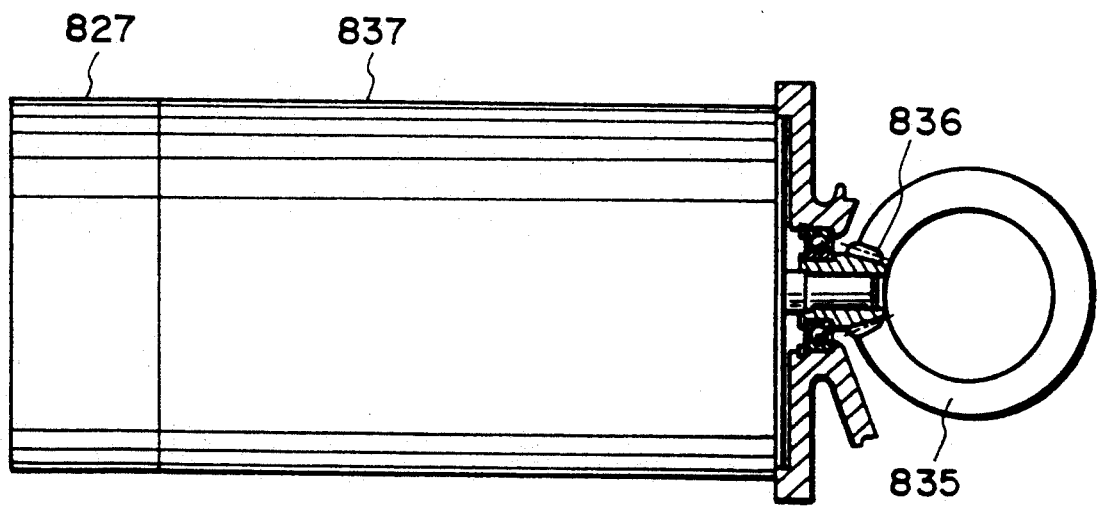
FIG. 16 is a sectional view taken on line XVI—XVI in FIG. 13.

A sector gear 846 is mounted to a shaft portion 843a of the above-mentioned ring member 843 so that it rotates as a unit,.and the sector gear 846 engages a gear mechanism 847a of a reduction gear 847. The above-mentioned reduction gear mechanism 847 is connected with a second motor 848. The driving force of the second motor 848 rotates the ring member 843 with its shaft portions 843a and 843b, and the steering ratio of the front and rear wheels is determined according to a size of the tilting angle (FIG. 12 shows that this tilting angle is zero) of the ring member 843 to the axis of the relay rod 813.

If the relay rod 813 rotates by the operation of the first motor 837 when the ring member 843 has tilted at a predetermined angle, that is, when the steering ratio is any value other than zero, a ball bushing 845 on the tip end side of the arm member 842 slides along the inner peripheral surface of the ring member 843 to move the relay rod 813 in the axial direction (vehicle width direction). The amount of movement of the relay rod 813 in the axial direction is in proportion to a product of the above-mentioned steering ratio and the rotational angle of the relay rod 813 which are respectively determined by the amounts of rotation of the second motor 848 and the first motor 837.

A steering mechanism 849, which consists of the above relay rod 813, tie rods 812L and 812R, etc., thus steers the rear wheels 802L and 802R by imparting a steering angle dependent upon the amount of rotation of the first motor 837 and that of the second motor 848.

A steering ratio sensor 828 is connected with a shaft portion 843a of the ring member 843 through a joint 851, and the steering ratio is detected by the steering ratio sensor 828 on the basis of the tilting angle of the ring member 843. The steering ratio information is output to a control unit 815 from the steering ratio sensor 828. A gear portion 852 is formed on the outer peripheral surface of the relay rod 813, and engages a pinion 853 connected with the rear wheels steering sensor 829.

The rear wheels steering angle is detected by the rear wheels steering sensor 829 on the basis of the amount of movement of the relay rod 813 in the axial direction, and the rear wheels steering angle information is output from the rear wheels steering angle sensor 829 to the control unit 815.

Operation control of the first motor 837 and the second motor 848 by the above-mentioned control unit 815 will be described.

The operation control of the second motor 848 by the control unit 815 and variable control of the steering ratio $\theta R/\theta F$ by the variable steering ratio mechanism 841 are normally performed on the basis of a plot shown in FIG. 17, and the operation control of the first motor 837 by the control unit 815 is performed on the basis of the handle steering angle $\theta H$. A steering angle dependent on the amount of rotation of the first motor 837 and that of the second motor 848 is transmitted to the rear wheels 802L and 802R through the steering mechanism 849 to steer the rear wheels 802L and 802R on the basis of the map shown in FIG. 18.

On the other hand, when either of the first and second motors 837 and 848 is out of order, the control unit 815 detects the trouble on the basis of signals from various sensors (that is, encoder 827, steering ratio sensor 828 and rear wheels steering angle sensor 829) in the rear wheels steering mechanism 814, and controls so that the amount of driving force other motor, which is not out of order, is set to zero.

That is, when the first motor 837 is out of order, the amount of driving force the second motor 848 and the steering ratio θR/θF in the variable steering ratio mechanism 841 become zero. When the second motor 848 is out of order, the amount of driving force of the first motor 837 and the amount of rotation of the relay rod 813 become zero. Since a state of two-wheel steering, in which the steering angle of the rear wheels 802L and 802R becomes zero, is thereby realized when either the first motor 837 or the second motor 848 is out of order, safety can be secured.

Moreover, since the amount of driving force of the motor 837 or 848, which is not out of order, gradually decreases from a value at the motor failure when the steering angle of the rear wheels 802L and 802R is set to zero, the rear wheels 802L and 802R are not rapidly returned like when the relay rod 813 is returned to the neutral position by a present load of the centering spring, and the safety can be further improved.

When steering the rear wheels 802L and 802R by further moving the above relay rod 813 in the axial direction, such a great steering force as to resist a preset load is not required, unlike before. Therefore, the motors 837 and 848 can be miniaturized and their output can be reduced, and at the same time, the rear wheels can be more quickly steered. Also since any centering spring, clutch and the like are not required, this is useful for miniaturizing the rear wheels steering apparatus.

As regards operation control of the first and second motors 837 and 848 by the control unit 815, it is not limited to the described modes. For example, the steering ratio θR/θF may be fixed at a predetermined value other than zero by stopping the operation of the second motor 848 while the steering of the rear wheels is being controlled, and it is effective to prevent oscillation phenomenon resulting from a displacement in operation of both motors 837 and 848.

According to the vehicle rear wheels steering apparatus of the present invention as mentioned above, the rear wheels are steered by imparting to the rear wheels a steering angle dependent on the amount of rotation of the first motor and that of the second motor, and the steering angle of the rear wheels is made zero by setting the driving force of one motor to zero when the other motor is out of order. Therefore, the safety can be secured when the motor is out of order, and the apparatus can be miniaturized and the rear wheels can be more quickly steered by eliminating the centering spring and clutch.

What is claimed is:

1. A vehicle rear wheels steering apparatus, comprising:
   a main motor;
   a sub-motor;
   a rod member, having an axis, for steering the rear wheels by moving in the axial direction;
   a guide member having a guideway to be tilted toward the axis of said rod member by a rotating force of said sub-motor; and
   an operating member projecting from said rod member in a radial direction and being guided by said guideway, wherein:
   said rod member rotates around the axis thereof by a rotating force of said main motor, and said operating member thereby rotates around the axis of said rod member along said guideway; and
   said operating member moves by a distance corresponding to the amount of rotation of said rod member and the amount of tilting of said guideway of said guide member together with said rod member in the axial direction of said rod member to steer said rear wheels when said operating member rotates around the axis of said rod member.

2. A vehicle rear wheels steering apparatus, comprising:
   a main motor;
   a sub-motor;
   a rod member, having an axis, for steering the rear wheels by moving in the axial direction;
   a guide member having a guideway to be tilted toward the axis of said rod member by a rotating force of said sub-motor; and
   an operating member projecting from said rod member in a radial direction and being guided by said guideway, wherein:
   said rod member rotates around the axis thereof by a rotating force of said main motor, and said operating member thereby rotates around the axis of said rod member along said guideway;
   said operating member moves by a distance corresponding to an amount of rotation of said rod member and an amount of tilting of said guideway of said guide member together with said rod member in the axial direction of said rod member to steer said rear wheels when said operating member rotates around the axis of said rod member;
   a reduction gear mechanism is connected with at least one of said main motor and said sub-motor;
   said reduction gear mechanism includes a shaft having an outer periphery in which a spiral groove is formed, a ball nut having an inner periphery in which a spiral groove is formed in correspondence with the first-mentioned spiral groove, a plurality of balls placed in both grooves, a rack formed on a side of said ball nut and a pinion for engaging said rack; and
   the space width of a tooth space at a center of said rack is smaller than that of other tooth spaces of said rack.

3. The vehicle rear wheels steering apparatus according to claim 2, wherein when said rack engages said pinion at a neutral position, the extension of a force occurring at the portion of engagement passes through an inward rather than an outermost portion of said spiral groove of the ball nut.

4. A vehicle wheels steering apparatus, comprising:
   a main motor;
   a sub-motor;
   a rod member, having an axis, for steering the wheels by moving in the axial direction;
   a guide member having a guideway to be tilted toward the axis of said rod member by a rotating force of said sub-motor; and an operating member projecting from said rod member in a radial direction and being guided by said guideway, wherein:

said rod member rotates around the axis thereof by a rotating force of said main motor, and said operating member thereby rotates around the axis of said rod member along said guideway;

said operating member moves by a distance corresponding to an amount of rotation of said rod member and an amount of tilting of said guideway of said guide member together with said rod member in the axial direction thereof to steer said wheels when said operating member rotates around the axis of said rod member; and rack teeth are formed on a part of an outer periphery of said rod member, each of said rack teeth extending over a substantial portion of said outer periphery in a circumferential direction, and said rack teeth engage a gear mounted to an input shaft of a rotation detecting device to detect an amount of movement of said rod member when said rod member moves in the axial direction while rotating.

5. A vehicle rear wheels steering apparatus, comprising:

a first motor for being controlled at least according to a steering wheel angle; a variable steering ratio mechanism for changing a steering ratio of front wheels to rear wheels; a second motor for controlling the steering ratio by driving said variable steering ratio mechanism; a steering mechanism for steering the rear wheels by imparting to the rear wheels a steering angle dependent upon an amount of rotation of said first motor and an amount of rotation of the second motor; and controlling means for controlling the first and second motors so that when either of said motors is out of order, an amount of driving force of the other motor is set to zero.

6. The vehicle rear wheels steering apparatus according to claim 5, wherein control means is provided to fix the steering ratio to a predetermined value by stopping the operation of the second motor while steering of the rear wheels is being effected.

* * * * *